Patented Nov. 21, 1950

2,531,329

UNITED STATES PATENT OFFICE 2,531,329

CHEESE MODIFYING ENZYME PRODUCT

Merle G. Farnham, Calhoun Farms, Wis.

No Drawing. Application September 27, 1946,
Serial No. 699,635

17 Claims. (Cl. 195—63)

This invention relates to improvements in enzyme compositions, in every respect satisfactorily usable in food products, and particularly to a cheese modifying enzyme composition extracted from edible animal tissues and to processes for extracting the composition.

The cheese making industry and its associated laboratories have searched for a considerable time for an enzyme which might be added to milk to promote ripening of cheese, that is, the development of the desired flavor, body consistency and odor. In view of the fact that the fatty acid content of cheese increases with age, it has been usually assumed that the effective enzyme would be a lipase which hydrolyzes the esters contained in the butterfat of milk. Many lipase compositions from various sources have been tried without, however, developing a true cheese flavor or shortening the cheese ripening time required.

Italian type cheese in particular is characterized by its high flavor which could heretofore be developed only by the use of so called "rennet paste" to provide both the rennin enzyme for curdling the milk and the other enzymes necessary to develop the desired flavor upon aging for periods up to eighteen months. The original rennet paste however, is made from the stomach and stomach contents of a kid which has been fed goat's milk shortly before the kid is slaughtered. The entire stomach and its contents are partially dried and ground to form a paste which is mixed with water to dissolve the enzyme, filtered and the filtrate added to milk in the cheese making process. Attempts have been made to substitute for the above, a paste made of lamb stomachs and milk curd from the cheese vat, but such substances do not produce the desired flavor regardless of the aging time allowed. Attempts have also been made to obtain the necessary enzymes from a paste made from lamb stomachs and milk curd from calves' stomachs. All of the above sources of the necessary enzyme composition are, however, objectionable and are not approved under either Federal or State laws and regulations governing food products, but no other source of the necessary enzymes has been found up to the present time. Consequently, enzyme preparations are not now used in the manufacture of domestic cheeses such as the cheeses of the Cheddar type.

It is therefore, one object of the present invention to provide an enzyme composition which is satisfactory in every respect for use in the preparation of foods.

Another object of the invention is to provide an enzyme composition for use in the manufacture of cheese and which is made from edible animal tissues.

Another object of the invention is to provide an enzyme composition for use in the manufacture of food products which will meet all of the laws and regulations relating to such products.

A further object of the invention is to provide an enzyme composition which will uniformly produce the desired flavor and consistency in cheese in a fraction of the time heretofore required.

A further object of the invention is to utilize material now considered waste and which meets all legal requirements for use in food products, in the preparation of an enzyme composition producing the desired flavor and constituency in cheese after a shorter aging time than is now usual.

A further object of the present invention is to provide a process for extracting enzyme compositions from animal tissues with a minimized bacterial content and extraction of globulin protein.

And a further object of the present invention is to provide a process for extracting enzyme compositions from animal tissues to obtain a predetermined enzyme concentration and to minimize inactivation of the enzymes.

I have found that enzyme compositions can be made from heretofore wasted animal tissue but which is classified as edible and meets all of the legal requirements for food products. The enzyme composition has the effect of producing a superior flavor and improved body consistency in cheese and cheese foods in a shorter time than was heretofore possible. The results are consistently uniform in the hands of various users in so far as can be determined by persons skilled in judging cheese. It is my belief, at the present time, that the composition includes at least one lipase, a proteolytic enzyme and other enzymes and constituents not yet identified, all of which contribute to produce the result described hereinafter.

As the source of material from which the composition is obtained, I take tissue from the head and neck of animals and preferably calves, although young mammals of other species may be used. After the tongue and trachea are removed, a considerable mass of tissues remains including the portion known to packers as the gullet. From such mass I take the cartilaginous material including the thyroid gland and the other glandular tissue extending from the base of the tongue to the trachea. Stated in anatomical terms, the tissues employed are that part of the pharyngeal region of mammals bounded in front by (1) the base of the tongue at a line just posterior to the vallate papillae on the dorsum of the tongue, (2) the soft palate, (3) the tonsilar folds: and including the entire larynx and its muscular and glandular adjuncts back to the first tracheal ring. I especially include those parts known as and included in the glosso-epiglottic region, the epiglottis, the glottis, and neighboring mucosal tissue with their underlying structures.

The material is ground to a size to pass through the one-quarter inch openings of a meat grinder although I have found that either or both an increased yield is obtained or the time of treatment is shortened if the material is reduced to a smaller size, provided the remainder of the equipment employed is suitable for handling the smaller size material. The ground mass is then mixed with approximately 25 per cent salt (sodium chloride) and 20 per cent of granular sawdust preferably from hardwoods, both by weight, and is dried at 105-110° F. in a tray drier to remove 40-60 per cent of the moisture. The addition of salt inhibits bacteria which would otherwise be activated at the drying temperature and the quantity of salt used is such as to precipitate the globulin protein to prevent extraction thereof and to produce a concentration of 10 per cent of salt in the first extracting solution. The sawdust absorbs moisture and increases the volume of the mixture thus allowing drying at the given range of temperatures in the minimum time and with the minimum loss or inactivation of the enzyme content. Drying of the saturated salt mixture also increases enzyme concentration in the extract, reduces the volume of extracting solution to be handled and lowers the bacterial content of the mixture.

The dried mass is extracted in a tank with an apertured false bottom approximately four inches above the true tank bottom. A material such as excelsior, preferably made from hardwoods and free from fine particles, is laid on the false tank bottom in such thickness as to keep any of the mixture from passing therethrough. Alternate layers of dried material and excelsior are then placed in the tank, the thickness of the extractible material layer being such as to permit free percolation of the extractive solution therethrough while the intermediate excelsior layers are such as to keep the several extractible material layers clearly separated.

The material in the filled tank is then completely covered with a 10 per cent solution of propylene glycol in water, with sufficient sodium bicarbonate to give a pH of 6.2-6.5. Propylene glycol is a preservative approved under the food and drug laws and regulations and has the property of penetrating protein tissues to assist the water and salt in extracting the enzymes. The extracting solution is recirculated through the tank at intervals preferably of two to three hours, for a sufficient length of time to dissolve all of the salt in the mixture and to saturate the extractive solution with the enzymes. It has been found that the time required varies from twenty-four to forty-eight hours, dependent upon the thickness of the extractible layers. The first extractive solution is then drawn off and the tank is refilled with a second extractive solution of 10 per cent propylene glycol with 10 per cent salt and sufficient sodium bicarbonate to maintain the pH in the given range. The second extractive solution is likewise recirculated at the same intervals for approximately one-half the time of recirculation for the first extractive solution and is then drawn off. Further extractions are made with solutions similar to and under the same conditions as the second extraction solution until tests indicate that all of the desired enzymes have been extracted.

The extractive solutions are then severally tested to make certain that the finished product will have the pH of 6.2-6.5. The liquid is then mixed thoroughly with a filter-aid in the proportion of one and one-half pounds to fifty gallons of extract and is filtered. A brilliant amber-colored liquid is obtained which is then standardized and packaged. During the percolation, filtration and testing, the several extracts are preferably kept below 50° F. to avoid deterioration in enzyme activity and to minimize the growth of bacteria.

Standardization is based on the lipase action of splitting the glycerides of fats to fatty acids, the production of fatty acids during a given time being proportional to the enzyme concentration. The present preparation being particularly useful in the manufacture of cheese, the standardization method is based on the lipase action on butterfat. Cream of 18-20 per cent butterfat content is brought to boiling and held at that temperature for thirty seconds and then cooled to room temperature. One part of formaldehyde is added per 1000 parts of cream to inhibit bacterial growth and the cream is divided into 75 cc. portions as test media. The different samples of test media are severally inoculated with 1 cc. of the various filtered extracts on hand while 1 cc. of distilled water is added to one sample as "control." Twenty-five cc. of each sample are then mixed with 5 cc. of ethyl alcohol to dissolve any fatty acids present and the mixture is titrated to neutrality with N/20 sodium hydroxide using phenolphthalein as an indicator, the quantity of sodium hydroxide required being recorded as the "original titration." The remainder of the several samples are then incubated at 39-40° C. for twenty-two hours, cooled to room temperature and again titrated to give an "incubation titration." The difference between the two titrations minus the increase in acidity in the control sample, is a measure of the activity of the various enzyme solutions on hand which are then blended to give the desired concentration for use.

The blended extracts are then bottled in amber bottles to minimize the effect of ultra-violet light and the bottled product is stored in a dark space at a temperature below 50° F. It has been found that the preparation may be stored under the above conditions for as long as desired without appreciable deterioration in activity.

In use, for example, in the making of an Italian type cheese, it has been found that a concentration requiring 5 cc. of N/20 sodium hydroxide to neutralize the 25 cc. portion of a sample under the above standard conditions, is satisfactory when used in the proportion of three to four ounces of the preparation per thousand pounds of milk. The exact quantity used is dependent on the flavor desired, the type of cheese to be made, the conditions of the milk, etc., as is well known in cheese-making practice. Provalone type cheese has been made with the present preparation used in conjunction with rennin extract rather than the commonly-used rennet paste. Three ounces of the present preparation were mixed with four ounces of rennin extract and the mixture was added to the milk at the usual time at which the rennet extract alone is added in cheese making. It was found that cheese made with the present preparation ripened in one month and yielded a better cheese than cheese made with rennet paste and ripened for four to six months. In addition to better flavor, it was found that the newer cheese had a better consistency and bouquet than the older cheese made with rennet paste only.

A cheese food has also been made by treating whole milk powder with the present preparation in the proportion of ten ounces per pound of whole milk powder and holding the mixture at a temperature of 95–105° F. for three to five days. A product was obtained having a strong cheese flavor and odor which was then added to a mild-flavored cheese having a good body, in such proportions as to produce the desired flavor and consistency in the final product. Treating the mixture by the usual methods for making processed cheese resulted in a cheese food having exactly the desired flavor and consistency. It is thus possible to eliminate the storage of considerable quantities of cheese for long periods to develop flavor and permits making cheese foods of controllably uniform quality.

The present preparation is applicable to the making of other types of cheeses with uniform qualities which are controllable by variation in concentration, temperature and acidity and without the necessity for storing cheese for long periods to develop the desired flavor and body. The present composition differs from other preparations now known in that no particular pH need be maintained during making of the cheese to preserve the activity of the composition. Hence, my composition may be used under normal cheese making conditions, whereas other preparations were successful only in the hands of highly skilled users. Further, the present preparation does not contain the enzymes associated with the preparations of lipases now known and which give increasingly bitter tastes to cheese upon aging. In fact, the present composition shows a decided improvement in flavor and cheese body upon aging.

In making processed cheese it has been found that the odor characteristic of well aged cheddar cheese is obtainable in two days' incubation at 100° F. while the characteristic odor of Roquefort is developed upon three to five days' incubation at the same temperature. It is accordingly believed that the present composition contains a number of lipases acting on different glycerides in butter fat to produce different long chain fatty acids and none of the short chain fatty acids which have objectionable tastes and odors.

Although but one embodiment of the present invention has been illustrated and described it will be apparent to those skilled in the art that various changes and modifications may be made therein without departing from the spirit of the invention or from the scope of the appended claims.

I claim:

1. An enzyme composition obtained from the edible head and neck tissues of at least partially milk-fed mammals and including a lipolytic and a proteolytic enzyme for hydrolyzing glycerides and proteins.

2. An enzyme composition obtained from the edible cartilaginous and glandular, head and neck tissues of at least partially milk-fed mammals and including a lipolytic and a proteolytic enzyme for hydrolyzing glycerides and proteins.

3. An enzyme composition obtained from the edible head and neck tissues of at least partially milk-fed mammals taken from between the base of the tongue and the first tracheal ring and including a lipolytic and a proteolytic enzyme for hydrolyzing glycerides and proteins.

4. An enzyme composition obtained from the edible neck tissues of at least partially milk-fed mammals taken from between the base of the tongue and the first tracheal ring and including a lipase and a protease for developing flavor in and reducing the body of cheese in a shortened aging time.

5. An enzyme composition obtained from the edible neck tissues of at least partially milk-fed mammals taken from between the base of the tongue and the first tracheal ring and including a lipase and a protease for developing a cheese aroma and flavor in a butter fat containing material in an aging time of from three to five days.

6. An enzyme composition obtained from the edible neck tissues of at least partially milk-fed mammals taken from between the base of the tongue and the first tracheal ring and including a lipase and a protease for developing a cheese aroma and flavor in a butter fat containing material in an aging time of three to five days when incubated at temperatures of 95–105° F.

7. A method for extracting enzymes from animal tissues comprising the steps of grinding the tissues to pass a quarter inch opening, mixing sodium chloride and sawdust with the ground tissue, drying the mixture to remove 46 to 60 per cent water, extracting the mixture in an acid solution of propylene glycol in water, filtering the extract, standardizing the filtrate, and storing the extract in a dark space.

8. A method for extracting enzymes from animal tissues, comprising the steps of grinding the tissues to pass a one-quarter inch opening, mixing 25 per cent of sodium chloride and 20 per cent of sawdust by weight with the ground tissues, drying the mixture to remove 40 to 60 per cent water therefrom, extracting the mixture with a 10 per cent solution of propylene glycol in water at pH of 6.2–6.5, filtering the extract, and storing the extract in a dark space.

9. A method for extracting enzymes from the head and neck tissues of animals comprising the steps of grinding the tissues to pass one-quarter inch opening, mixing 25 per cent of sodium chloride and 20 per cent of sawdust by weight with the ground tissues, drying the mixture to remove 40 to 60 per cent water therefrom, extracting the mixture with a solution of 10 per cent propylene glycol in water at pH 6.2–6.5, filtering the extract, standardizing the filtrate, and storing the standardized filter in a dark space, the last four steps mentioned being performed at a temperature below 50° F.

10. In a method for extracting enzymes from the head and neck tissues of mammals, the steps of reducing the tissue to particles less than one-quarter inch in any dimension, mixing the ground material with sodium chloride for inhibiting bacterial growth and precipitating globulin protein, adding to the mixture a material for absorbing moisture and increasing the volume of the mixture, extracting the mixture with a solution of propylene glycol in water, filtering the extract, standardizing the filtrate to a given potency and to a pH of 6.2–6.5, and storing the mixture in a dark place.

11. In a method for extracting enzymes from the head and neck tissues of mammals which are at least partially milk-fed, the step of reducing the tissues to particles not more than one-quarter inch in any dimension, mixing the ground material with 25% by weight of sodium chloride for inhibiting bacterial growth and precipitating globulin protein, adding to the mixture 20% by weight of material for absorbing moisture and increasing the volume of the mixture, drying the mixture at 105–110° F. for removing 40 to 60% of total moisture therefrom, extracting the mixture with a solution of propylene glycol in water, filtering the extract, standardizing the filtrate to a given potency and to a pH of 6.2–6.5, and storing the mixture in a dark place.

12. In a process for making cheese, the step of adding to a mixture of milk and an rennet-containing material, a composition of lipolytic and proteolytic enzymes obtained from edible head and neck tissues of mammals, the composition developing flavor and odor in the cheese and modifying the body of the cheese.

13. In a process for making cheese, the step of adding to milk at the time of addition of the coagulant for the milk, a composition of lipolytic and proteolytic enzymes obtained from edible mammalian tissues taken from between the base of the tongue and the first tracheal ring, the composition developing flavor and odor in the cheese and modifying the body of the cheese.

14. In a process for making cheese, the step of adding to a mixture of milk and a coagulant therefor and at the time of addition of such coagulant, a composition of lipolytic and proteolytic enzymes obtained from edible cartilaginous and glandular tissues taken from between the base of the tongue and the first tracheal ring of mammals, the composition developing flavor and odor in the cheese and modifying the body of the cheese in a reduced time as compared to cheese not made with the said composition.

15. Cheese mixed with a composition comprising lipolytic and proteolytic enzymes obtained from the edible pharyngeal tissues of mammals and an edible carrier containing sufficient sodium chloride to inhibit bacterial growth in the composition, the composition having a substantial portion of the non-enzymatic proteins removed therefrom.

16. Cheese having the flavor and odor developed and the body thereof modified by a composition comprising an active lipolytic and proteolytic enzymes extract from the glosso-epiglottic tissues of young mammals and sodium chloride in an edible inert preservative for the enzymes, the sodium chloride being in sufficient quantity to inhibit bacterial growth in the composition and the composition being adjusted to pH 6.2 to 6.5 prior to addition to the milk.

17. Cheese ripened by addition to the milk in the proportion of 2 to 10 ounces per thousand pounds of milk of a standardized composition comprising an active lipolytic and proteolytic enzyme extract from the edible pharyngeal tissues of milk-fed mammals and sodium chloride in an edible inert liquid carrier preserving activity of the enzymes, the sodium chloride being in sufficient quantity to precipitate globulin protein from the composition and the composition being adjusted to pH 6.2 to 6.5 prior to addition to the milk.

MERLE G. FARNHAM.

REFERENCES CITED

The following references are of record in the file of this patent:

UNITED STATES PATENTS

| Number | Name | Date |
| --- | --- | --- |
| 1,866,633 | Ehrenreich | July 12, 1932 |
| 2,322,148 | Lane et al. | June 15, 1943 |
| 2,370,878 | Roundy et al. | Mar. 6, 1945 |
| 2,370,879 | Roundy et al. | Mar. 6, 1945 |

OTHER REFERENCES

Jour, Dairy Science, Apr. 1943, pages 331–336, by Babel et al.